(12) United States Patent
Clegg

(10) Patent No.: US 7,480,448 B2
(45) Date of Patent: Jan. 20, 2009

(54) RAPIDLY CHANGEABLE PHOTOGRAPHIC AND STAGE BACKDROP LIFTING DEVICE

(76) Inventor: Gary D. Clegg, 3359 Chimney Peak, Idaho Falls, ID (US) 83404-8233

( * ) Notice: Subject to any disclaimer, the term of this patent is extended or adjusted under 35 U.S.C. 154(b) by 0 days.

(21) Appl. No.: 11/744,220

(22) Filed: May 4, 2007

(65) Prior Publication Data

US 2007/0258705 A1 Nov. 8, 2007

Related U.S. Application Data

(60) Provisional application No. 60/746,493, filed on May 5, 2006.

(51) Int. Cl.
G03B 15/06 (2006.01)
(52) U.S. Cl. ............................ 396/3; 211/117; 248/328
(58) Field of Classification Search ............... 396/3; 211/113, 115, 117; 248/328, 329, 330.1, 248/331, 332; 40/617; 359/461
See application file for complete search history.

(56) References Cited

U.S. PATENT DOCUMENTS

| | | | |
|---|---|---|---|
| 439,512 A | 10/1890 | Howe | |
| 588,597 A * | 8/1897 | Overpeck | 160/120 |
| 596,312 A | 12/1897 | Badgley | |
| 624,111 A | 5/1899 | Snow | |
| 3,128,688 A | 4/1964 | Coda | |
| 4,340,293 A | 7/1982 | Russotti | |
| 5,389,993 A * | 2/1995 | Adolphi et al. | 396/3 |
| 5,619,299 A | 4/1997 | Fleming-Schaub | |
| 5,799,213 A * | 8/1998 | Saar | 396/3 |
| 5,953,542 A | 9/1999 | Flemming | |
| 5,979,671 A * | 11/1999 | Pan et al. | 211/1.57 |
| 2006/0078320 A1 | 4/2006 | Hiesinger | |

* cited by examiner

Primary Examiner—W. B. Perkey
(74) Attorney, Agent, or Firm—Eric M Barzee (57) ABSTRACT

This invention relates to the use of suspended materials as a backdrop for photography or stage productions. The suspended materials may be stored on a spool device. Such spool devices may include tubes or spindles constructed of metal, of cardboard, of plastic or other lightweight and inexpensive materials. The spool device may also include means for attaching the tube or spindle to a lifting device. Such attachment means may include a pair of interconnectable coupling devices, one fixed to the spool and the second attached to the lifting device.

25 Claims, 10 Drawing Sheets

RAPIDLY CHANGEABLE PHOTOGRAPHIC AND STAGE BACKDROP LIFTING DEVICE

BACKGROUND OF THE INVENTION

1. Field of the Invention

The present invention relates to displaying and storage of backdrops for use with photographs and stage productions. More particularly, the invention relates to systems and methods of changing, displaying and storing backdrops.

2. State of the Art

In photography, stage productions and other instances where it is desirable to create an illusion of a particular time or place or of no particular time or place, a moveable backdrop is required to set the proper look and feel of the environment required by the situation. As needs change, the backdrop environment must be changed to match the need.

Because a backdrop is typically suspended high above the floor, a user must climb a ladder to change most of currently available backdrops. Further these backdrops require the use of wrenches, screwdrivers, pliers, or other tools to remove the old backdrop and install the new one. Not only is it inconvenient to change a backdrop from the top of a ladder, it can also be dangerous.

In response to this difficulty, some backdrop systems have been developed that contain more than one backdrop on a rotating wheel. Thus, if one desires to change a backdrop, the first backdrop is rolled back onto its spool, the wheel is rotated, and the next back drop is lowered. Other systems employ a number of backdrops in a single loop. All of these systems suffer from the same limitations. They are expensive to purchase and if the user wants to obtain a new series of backdrops, the entire loop or wheel must be replaced. Furthermore, in the current systems, Some photographers have resorted to using a backdrop attached in a makeshift manner to a wall or thrown over a simple rope, wire or framework. When a change of backdrop is needed, the first backdrop is pulled down and the new backdrops is taped up or thrown over the wire or framework. This can result in damage to the backdrops which frequently cost hundreds to thousands of dollars. Moreover, it leads to a less than professional atmosphere at a photographic studio where image is paramount. When backdrops are used without a proper storage system, they are frequently stored in piles in the corner of the studio, or on storage shelves, where they may suffer additional damage.

Therefore it would be advantageous to provide a method and a device for quickly changing a backdrop without the use of ladders, scaffolding, catwalks, or other elevated devices. Where multiple backdrops are used, a method for safely storing backdrops is needed to preserve the life and appearance of the cloth or cloth-like material while making them readily available for use.

BRIEF SUMMARY OF THE INVENTION

One aspect of the present invention is a backdrop system that can be used for photography, stage productions, or other instances where a backdrop may be desired. The backdrop system has a spool on which a backdrop can be either temporarily or permanently attached and wound in a flat and unwrinkled condition. A mount is provided for attaching the spool to a lifting device. The lifting device can adjust the vertical position of the spool. A rolling device is also connected to the spool for rolling and unrolling the backdrop on the spool. The lifting device can be configured to raise or lower the spool to any position from ground level to the ceiling or other upper limit. The spool is readily removable from the mount and can be removed when the spool is in the lowered vertical position. The lowered vertical position may be when a user is standing, kneeling, or sitting at ground level. The backdrop system may also provide for the horizontal adjustment of the spool.

The attachment of the spool to the mount may be configured with male mating protrusions in the mount with female mating apertures in the spool. In other embodiments, male mating protrusions may be in the spool and female mating apertures in the mount. Alternatively, a combination of male and female mating parts may be in both the spool and the mount. The attachment can be made by inserting male mating protrusions into the female mating parts and twisting the mount or spool to the locked position. When the spool is in the attached and rotated position, a lock may be engaged securing the spool to the mount of the lifting device.

For many uses of the backdrop system, it may be desirable to have more than one backdrop. In such instances, the system may have a plurality of backdrops. The plurality of backdrops may each be secured on a separate spool or stored by other means and fastened, each in turn of use, to the same spool. The plurality of backdrop spools may be stored, for example, on a storage rack. Additionally, the spools may be configured to receive a storage stopper in an end and be propped against a wall for storage. The backdrop system may be configured to accommodate and adjust for spools of varying lengths.

The backdrop spool has an elongated tube portion with a first end and a second end. Adjacent both the first end and the second end of the spool, a flange is presented. The flanges may comprise attachment points for receiving mating members of the lifting spool. Further the flanges may have a lock for securing the backdrop spool to the lifting spool. Such locks may be a locking pin. Further the locks may be a hook and latch, a bolt, a spring lock, or the like.

The lifting device may be driven by motor or may be manually operated. In one embodiment, the lifting device comprises a lifting spool, such as a wheel, for attachment to the backdrop spool. The lifting spool may be weighted with ballast. A flexible strap, cable, rope, or cable may be looped around the lifting spool and windably attached to a sheave of a motorized or manual lift. The hoist may have a split sheave that is configured to receive the strap from the lifting spool at the first end of the backdrop spool and the strap from the lifting spool at the second end of the backdrop spool.

The system is also configured to allow for the rolling or unrolling of the backdrop on the backdrop spool. In one embodiment, the rolling and unrolling are accomplished simultaneously with the vertical adjustment of the backdrop spool. In this embodiment, the lift motor or manual lift may power the rolling and unrolling of the backdrop. Alternatively, the rolling and unrolling of the backdrop may be powered by a motor or manual means independent of the raising and lowering of the backdrop spool.

The control of the raising and lowering and the winding and unwinding of the backdrop spool can be accomplished in a variety of ways. For example, the raising and lowering may be controlled by directly activating the lifting device. Alternatively the lifting device may be controlled by wireless or wired remote control. Likewise the rolling of the backdrop on the backdrop spool may be directly controlled or through indirect remote control.

The present invention also relates to a method of changing a backdrop. The method includes the step of lowering a backdrop spool to which the backdrop is attached from a first height to a second height. Alternatively the method may include lowering the lifting spools on a suspension system without a backdrop spool from the first height to a second height. In general the first height will be a height above the ground level such as at or near the ceiling or a room and the second height will be a height at which a user can easily reach the spool while maintaining contact with the floor. Once the backdrop spool is lowered, the backdrop spool may be removed from the suspension system. A second backdrop spool may then be obtained and attached to the suspension system and the spool is raised to the first height.

The method may also contain the step of winding the first backdrop on the backdrop spool prior to lowering it. The winding may be performed prior to lowering the backdrop spool from the first height to the second height or may be performed after the backdrop spool is lowered to the second height. The winding may also be performed simultaneously with the raising or lowering of the backdrop, or may be performed independently of the raising or lowering of the backdrop.

Other features and advantages of the present invention will become apparent to those of skill in the art through consideration of the ensuing description, the accompanying drawings, and the appended claims.

BRIEF DESCRIPTION OF THE DRAWINGS

The foregoing and other advantages of the invention will become apparent upon reading the following detailed description and upon reference to the drawings in which.

DETAILED DESCRIPTION OF THE INVENTION

Although the foregoing description contains many specifics, these should not be construed as limiting the scope of the present invention, but merely as providing illustrations of some exemplary embodiments. Similarly, other embodiments of the invention may be devised that do not depart from the spirit or scope of the present invention. Features from different embodiments may be employed in combination. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced thereby.

Figure 1:
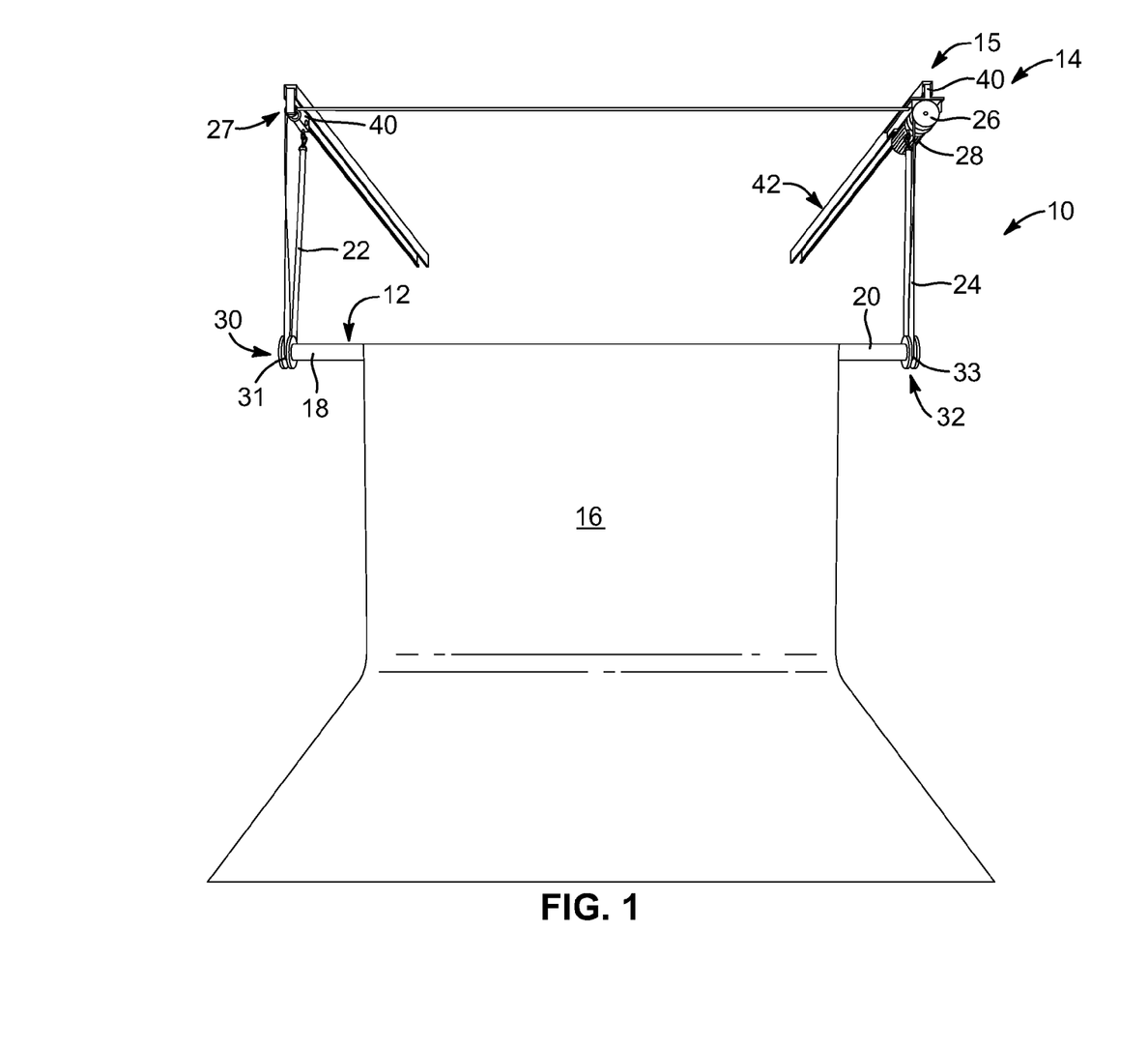
FIG. 1 is a front perspective view of one embodiment of a backdrop system according to the present invention.
Figure 2:
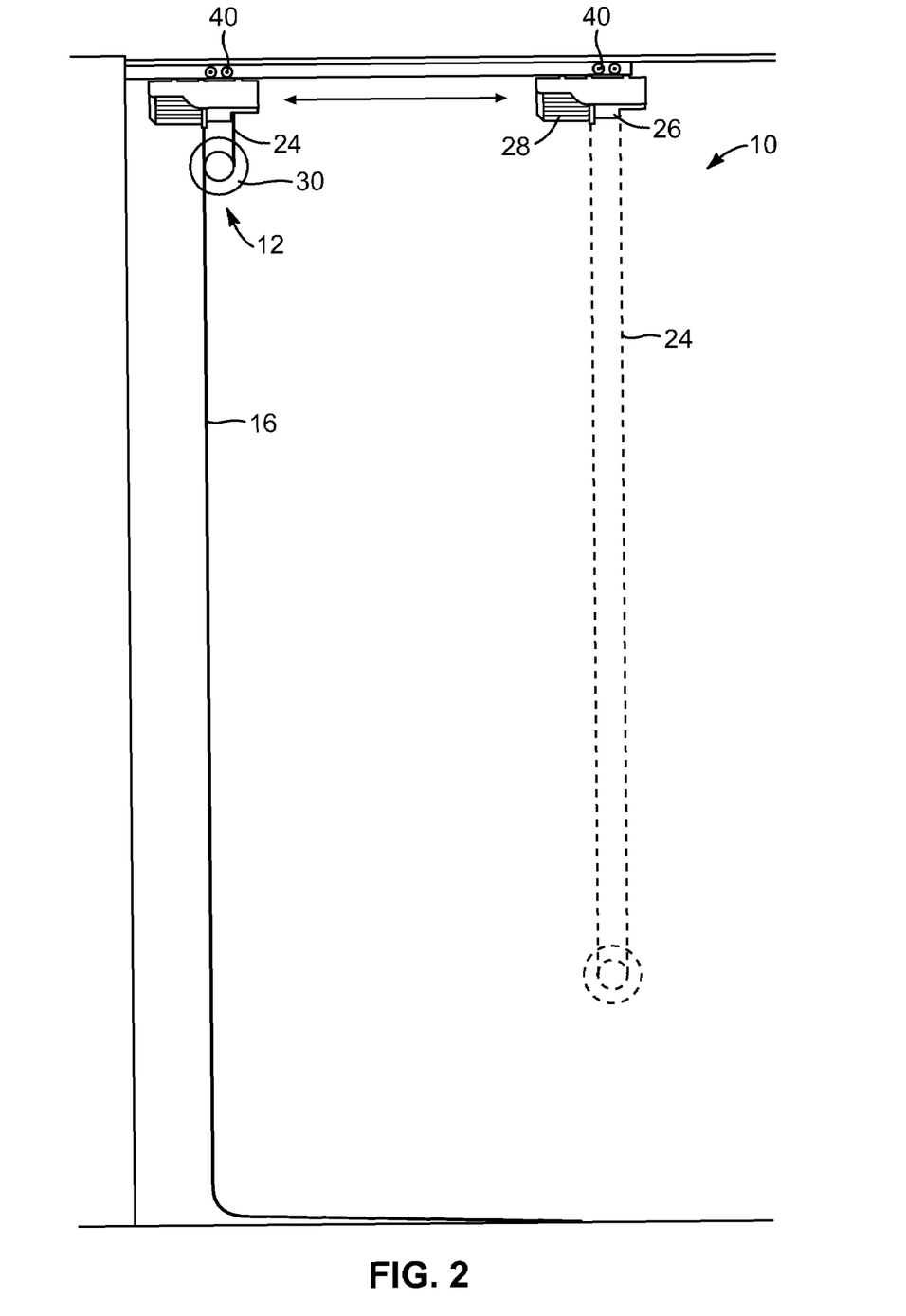
FIG. 2 is a side perspective view of one embodiment of a backdrop system according to the present invention.
Figure 3:
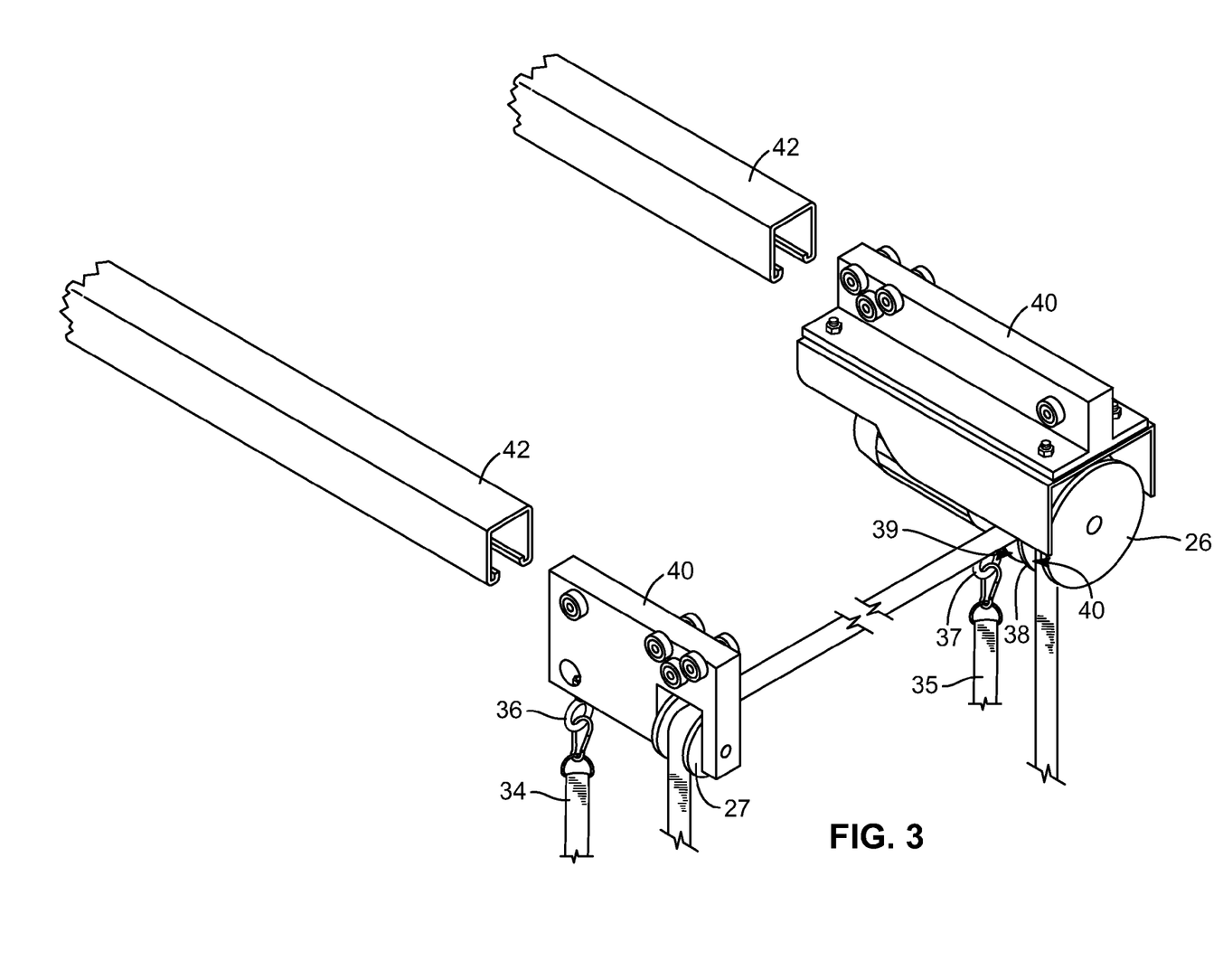
FIG. 3 is a detailed perspective view of a suspension system of one embodiment of a backdrop system according to the present invention.

Referring to FIGS. 1, 2, and 3 a backdrop system 10 is presented. The backdrop system can be used in for example a photographer's studio, in stage productions, or other instances. The backdrop system 10 has a spool 12 that can be suspended from a lifting device 14. The spool 12 is configured to receive thereon a backdrop 16. The backdrop 16 can be a fabric backdrop or other flexible materials that can be wound on the spool 12. The backdrop 16 can have a scene presenting the illusion of another place. Alternatively the backdrop may be dyed, colored, or painted to present a suitable background for a photograph, video conference, stage production, or other event.

The spool 12 is suspended from the lifting device 14. The lifting device 14 has a hoist 15. The hoist comprises lifting spool mounts 30, 32 on either end 18, 20 of the spool 12, a set of straps 22, 24, a sheave 26, a pulley 27, and a motor 28. The lifting spool mounts 30, 32 are configured to be attached to opposite ends 18, 20 of the spool 12. The first end 34, 35 of the straps 22, 24 are secured to an attachment point 36, 37 such as an eyebolt. The straps 22, 24 run downward from the attachment points 36, 37 and around the lifting spool mount wheels 31, 33. The first strap 22 runs from the mount wheel 31 to a pulley 27 and across to the sheave 26. The second strap 24 runs from the lifting spool mount wheel 33 to the sheave 26. In the illustrated embodiment a split sheave 26 has a partition 38 between the chambers 39, 40 that receive the first and second straps 22, 24. In an alternative embodiment, a single chambered sheave (not shown) may be used. It will be appreciated that any flexible material may be used in place of the straps 22, 24 such as rope, cable, chain, or the like. In one present embodiment nylon strap is used.

The sheave 26 may be turned by an electric motor 28 or by manual drive means. This embodiment is such that when the sheave 26 is turned in a first direction, the straps 22, 24 are drawn around the mount wheels 31, 32 on both ends of the spool 12. The straps 22, 24 turn the spool in one circular direction, winding or unwinding the backdrop 26. When the sheave 26 is operated in the opposite direction, the straps 22, 24 are drawn in the opposite direction around the mount wheels 31, 32 and the spool 12 is rotated circularly in the opposite direction, winding or unwinding the backdrop 16.

Additionally, by rotating the sheave 26 in a first direction, the straps 22, 24 are drawn onto the sheave thereby raising the spool 12. When the sheave 26 is rotated in the opposite direction, the straps 22, 24 are unrolled from the sheave 26 thereby lowering the spool 12.

In this embodiment, the rolling and/or unrolling of the backdrop 16 may done at the same time as the raising and lowering of the spool 12. If a user wishes to maintain the rolled or unrolled condition of the backdrop 16 while raising or lowering the spool 12, a hand placed on the spool to stop the rolling while operating the sheave drive motor 28 will maintain the rolled or unrolled position of the backdrop 16.

The lifting device may also have a screw drive system for raising and lowering the spool 12. In such an embodiment a screw is turned against a threaded block, driving the assemblies on both sides upward or downward.

To allow for the horizontal adjustment of the backdrop, the pulley 27, sheave, motor, and attachment points 36, 37 can be secured to trolleys 40 that are set in a track 42. The trolleys 40 and track 42 allow a user to adjust the horizontal position of the backdrop 12. Such horizontal adjustment may be made while the spool is in the raised or lowered position. The adjustment is made by applying a force in the direction in which one desires to move the backdrop. Such horizontal adjustment can allow a photographer to use varying lighting techniques, by placing one or more lights behind the backdrop 12. The horizontal adjustment of the backdrop 12 may be either manual or powered by a motor that moves the trolleys 40 in the desired direction.

Figure 4A:
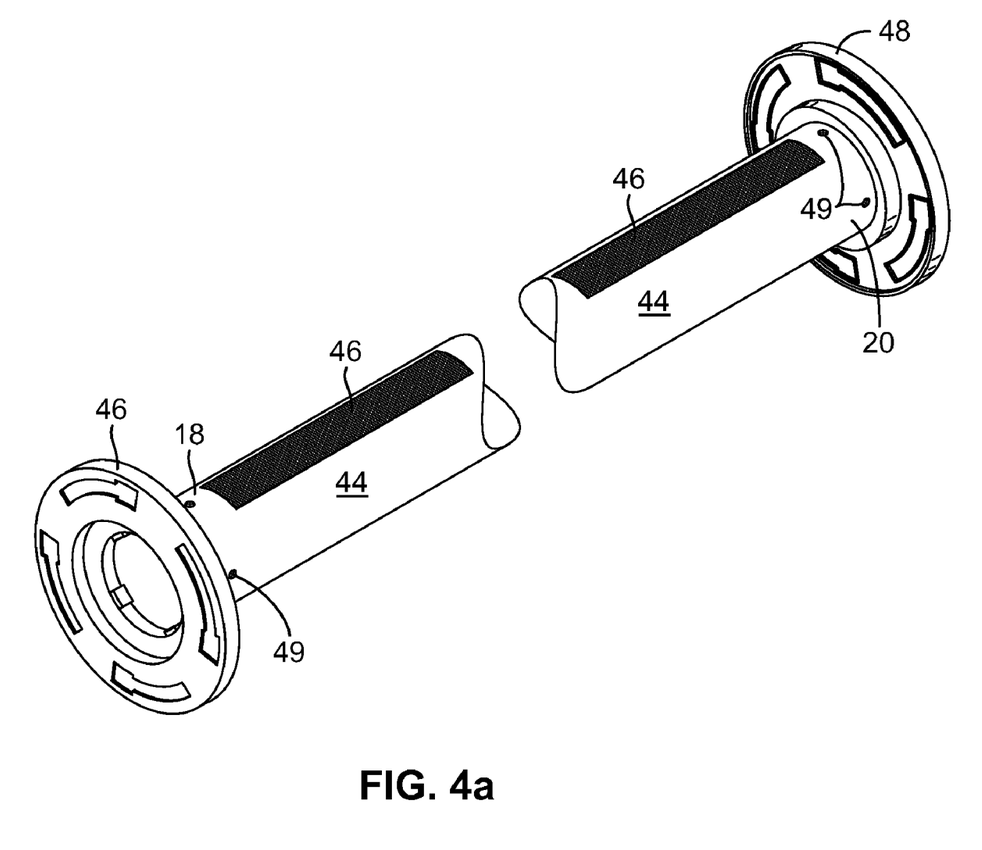
FIG. 4A is a perspective view of a backdrop spool of one embodiment of a backdrop system according to the present invention.

Referring now to FIG. 4A, one embodiment of a spool 12 is presented. The spool 12 has an elongated cylinder 44. The cylinder 44 may be a hollow tube of such material as metal, plastic, fiber glass, or cardboard. Alternatively the cylinder 44 may be a solid structure such as a wood dowel. In one present embodiment, the cylinder is an aluminum tube having a diameter of about 3 inches. It will be appreciated that the length and diameter of the cylinder 44 may vary depending on the desired use of the backdrop system 10.

The backdrop spool 12 can also have fasteners 46 whereby the backdrop 16 may be secured to the spool 12. In the illustrated embodiment, the fasteners 46 are hook and latch type fasteners. Alternatively other fasteners 46 may be used such as adhesives, snaps, rivets, screws, and the like. In other embodiments it may be desirable to roll the backdrop 16 on the spool 12 without the use of fasteners. In such embodiments, the friction of the wound backdrop 16 on the backdrop spool 12 may suffice to hold the backdrop 16 during the rotation of the spool 12.

The spool 12 has a first end 18 and a second end 20. A flange 48 can be attached to both ends 18, 20 of the backdrop spool 12. The flanges 48 can be constructed independently from the cylinder 44. The flanges 48 can be molded from plastic, or may be cut or molded from wood, cardboard, metal, fiberglass, and the like.

Figure 4B:
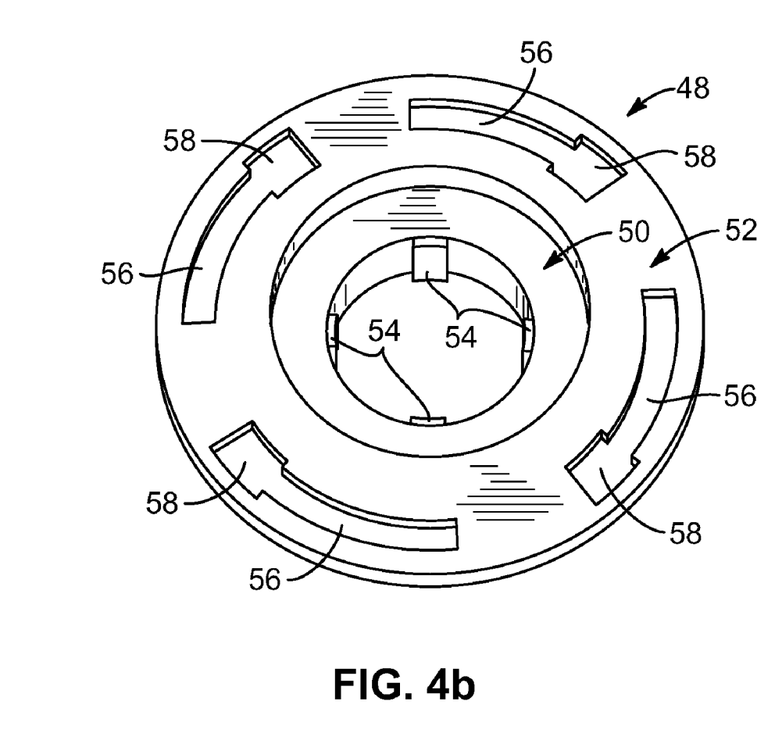
FIG. 4B is a bottom perspective view of a backdrop spool flange according to one embodiment of the present invention.
Figure 4C:
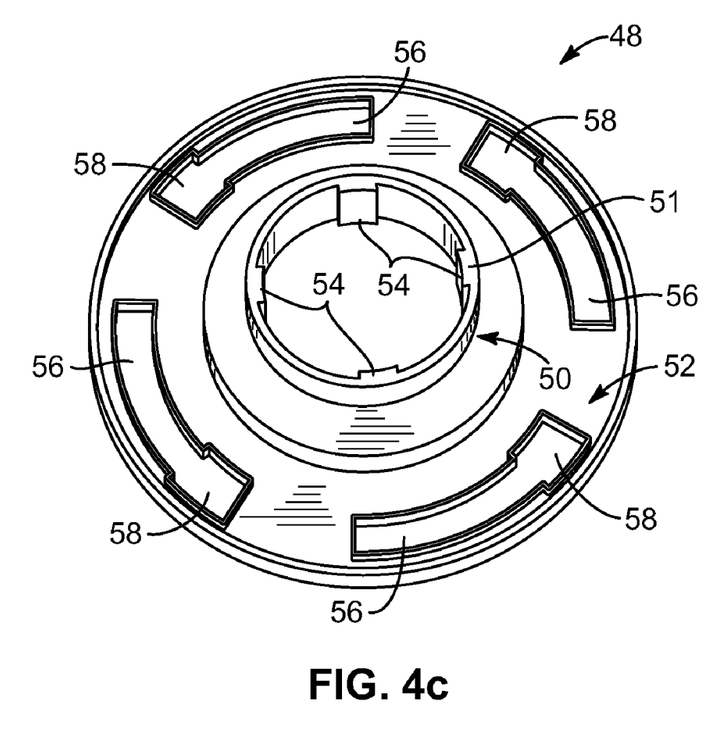
FIG. 4C is a top perspective view of a spool flange according to one embodiment of the present invention.

One particular embodiment of a flange 48 is shown in more detail in FIGS. 4B and 4C. The flange 48 has an inner ring 50 and an outer ring 52. The inner ring 50 has a protrusion 51 extending away from the generally flat flange 48. The protrusion 51 has an outside diameter that is selected to fit snugly within the inside diameter of the tubular cylinder 44 of the spool 12. A series of ribs 54 are run the length of the inside diameter of the protrusion 51. The ribs 54 serve the dual purpose of strengthening the protrusion 51 and providing attachment points if the flange 48 is to be attached to the spool 12 by screws or rivets 49. Alternatively, the flange 48 may secured to the cylinder 44 by an adhesive or by friction.

The outer ring 52 has a plurality of slots 56 with an enlarged notch 58. As will be discussed below, the slots 56 and notches 58, serve as female mating members for the attachment of the flange 48 and the backdrop spool 12 to the lifting spool mount 30 of the hoist system 15.

Figure 5:
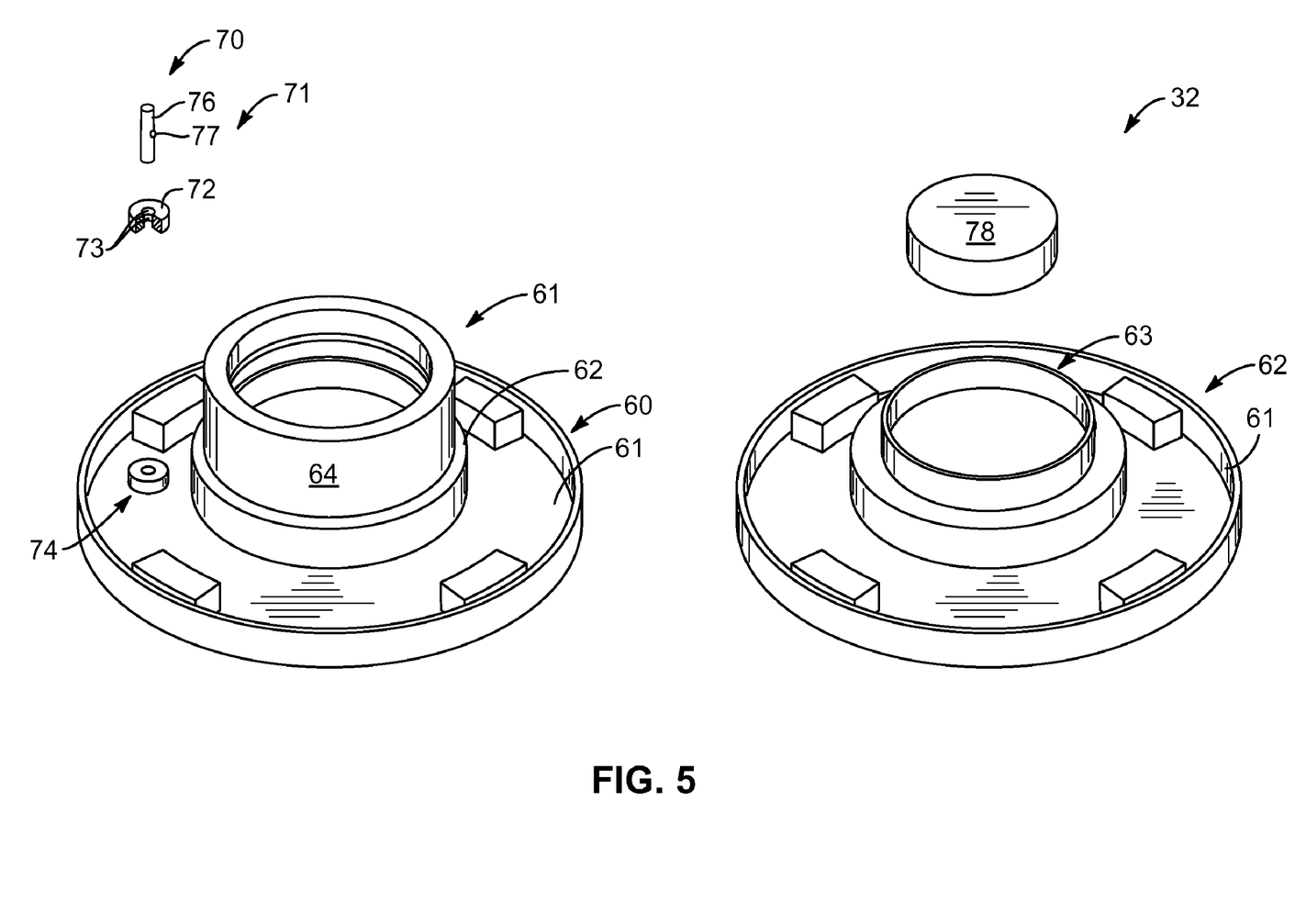
FIG. 5 is an exploded view of a lifting spool mount of one embodiment of a backdrop system according to the present invention.
Figure 6:
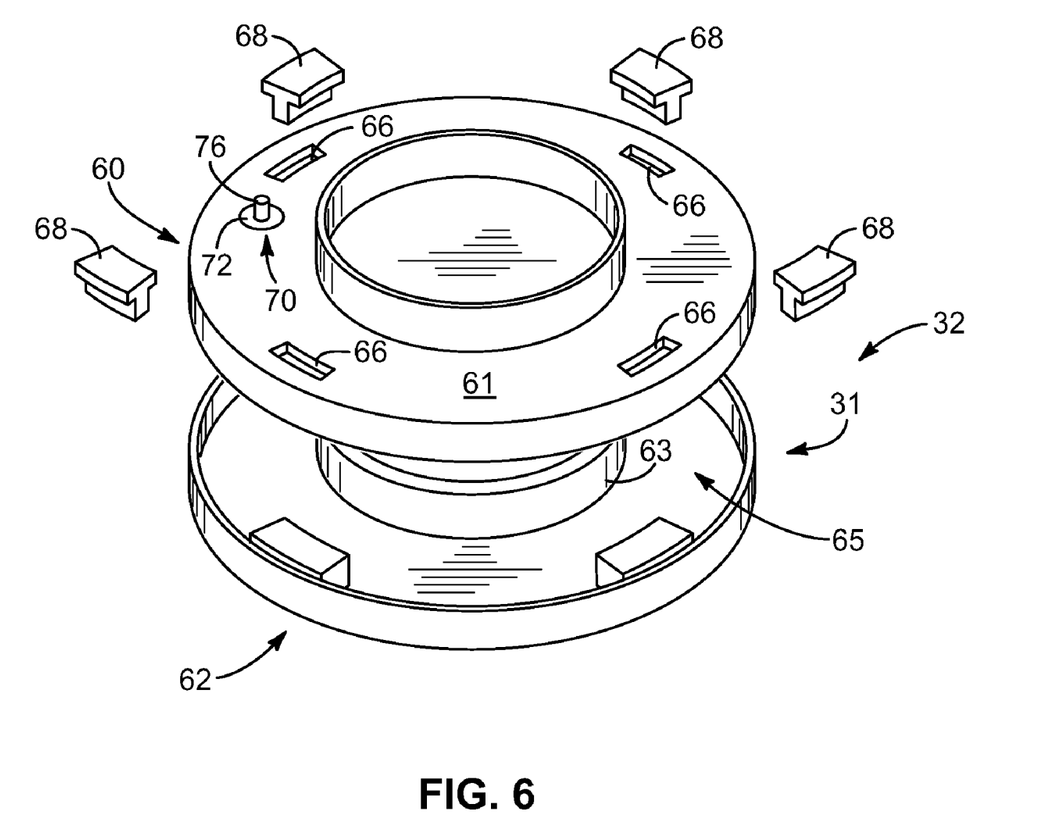
FIG. 6 is a perspective view of a lifting spool mount of one embodiment of a backdrop system according to the present invention.

One embodiment of a lifting spool mount 30, 32 is shown in FIG. 5 and 6. The mount 30, 32 has two flanges 60, 62 joined by a central cylinder 64. The flanges 60, 62 and the cylinder 64 create a channel 65 for receiving the straps 22, 24 of the hoist. The cylinder 64 can be coated with a non-slip surface or may be lined on the exterior with a rubbery material to provide a tactile surface for gripping the straps 22, 24.

The cylinder 64 can be an integrated part of one of the flanges 60, 62. Alternatively, a short pipe 61 can be secured to a rim 67 that extends outwardly from the inner ring 63.

Ballast 78 in the interior of the cylinder 64 stabilizes the lifting spool mounts 30, 32. The weight of the ballast provides a downward force providing for smooth and correct operation of the hoist when a spool 12 is not attached to the lifting spool mounts 30, 32. The ballast 78 may be a metal disk 78 or alternatively may be a fluid contained within a bladder (not shown) in the center of the cylinder 64. Other examples of ballast may include metal, glass, lead shot, wood or plastic balls, metal filings, rocks, concrete or other similar materials.

Referring to FIG. 6, the flanges 60, 62 of the lifting spools 31, 33 have an inner ring 63 and an outer ring 61. The outer ring 61 of the flange 60 that will be positioned next to the flange 48 of the spool 12 has slots 66 in which T-shaped protrusions 68 can be inserted and secured by adhesives, screws, or friction. Alternatively, the T-shaped protrusions 68 may be molded as an integral part of the flange 60. The T-shaped protrusions 68 serve as male mating members for the attachment of the lifting spool mount 30, 32 to the backdrop spool 12.

A lock 70 is also located in the outer ring 61 of the flange 60. The lock of the illustrated embodiment is a pin lock 71. The pin lock includes a bushing 72 molded into the outer ring 61. The bushing 72 may be made of metal such as brass. The bushing has one or more external grooves used to retain the bushing 72 in the flange 61 and two internal grooves 73. A detent pin 76 is inserted into the bushing 72. When the ball 77 of the detent pin 76 is in a groove 73, the pin 76 is locked in place in that position and cannot move without the imposition of some force. Thus, the pin 76 has two locked positions corresponding to when the pin is in either groove 73. A first locked position is with the pin 76 protruding from the band 72 and extending into the channel between the two flanges 60, 62 of the mount 30. The second locked position is with the pin 76 protruding from the band 72 and extending toward the side of the flange 60 with the T-shaped protrusions 68, which provides a locking function against the rotational motion of backdrop spool mating flange 48.

Figure 7:
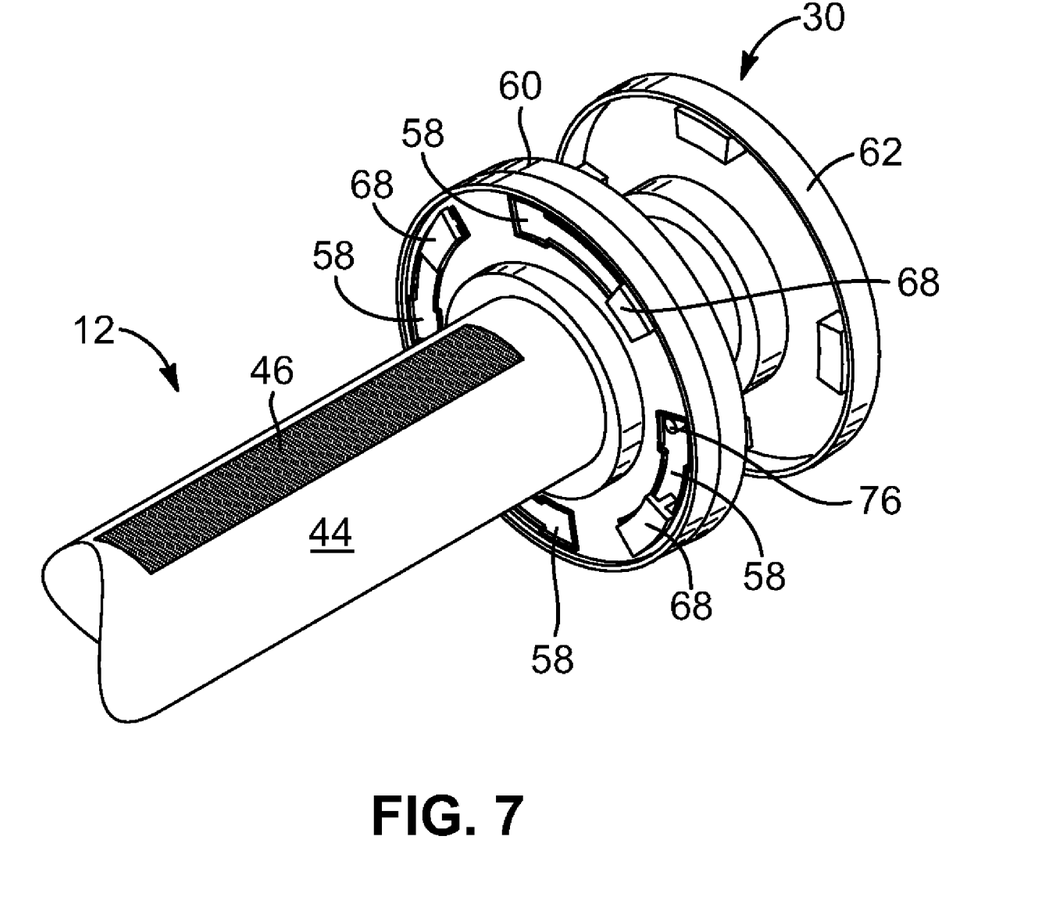
FIG. 7 is a perspective view of a backdrop spool connected to a lifting spool mount of a lifting device according to one embodiment of the present invention.

Referring to FIG. 7 the attachment of the spool 12 to a lifting spool mount 30 is illustrated. The attachment is made by inserting the T-shaped protrusions 68 of the lifting spool mount flange 60 into the notches 58 of the spool flange 48. When all of the T-shaped protrusions of one flange 60 are inserted into the notches 58, either flange 48, 60 is rotated thereby positioning the bases of the T-shaped protrusions 68 in the elongated slots 56 of the spool flange 48. The connected flanges can be locked in place by pushing lock pin 76 from the first position to the second position and into the notch 58 of the flange 48.

Other locks can be used to lock the connected flanges 48, 60 together. For example, a locking segment (not shown) can attached to a spring steel strip fastened to the opposite side of lifting spool flange 60 from the T-shaped protrusions 68, taking the place of lock pin assembly 70. When flanges 48, 60 are at their extreme rotated position, the spring strip moves a lock block into a space in both mating flanges 48, 60 and prevents further flange rotation with relation to the other flange.

In certain embodiments the lifting spool mount flange 60 or the backdrop spool flange 48 has a short tube section (not shown) that is fastened permanently into, and extents outwardly from lifting spool flange 60 and fits snuggly within the center of the corresponding spool flange 48. This tube section provides shear strength to the combined backdrop spool 12 and lifting spool mount 32 assembly.

Figure 8:
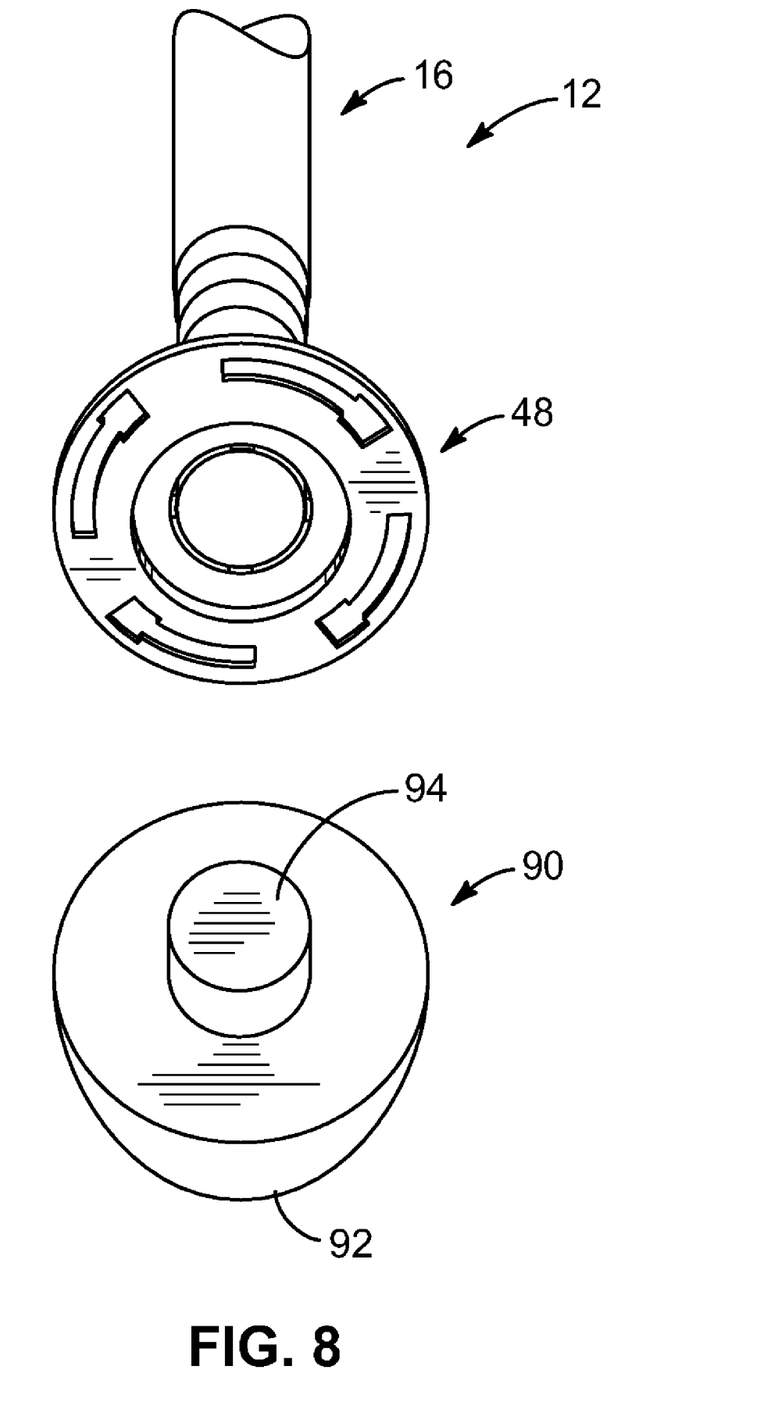
FIG. 8 is a perspective view of a spool storage system according to one embodiment of the present invention.

Referring now to FIG. 8, one alternative for storing the spools 12 and backdrops 16 is illustrated. A stopper 90 made of rubber or other compressible material is configured with a rounded bottom 92 and a stem 94. The stem 94 has a diameter selected to fit within the opening 47 at either end of the spool 12. The stem 94 of the stopper 90 can be inserted into this opening 47 creating a base for the spool 12. The spool 12 may then be propped up against a wall or in a closet with the stopper 90 preventing the spool from slipping on the floor or from being damaged in contacting the floor.

Figure 9A:
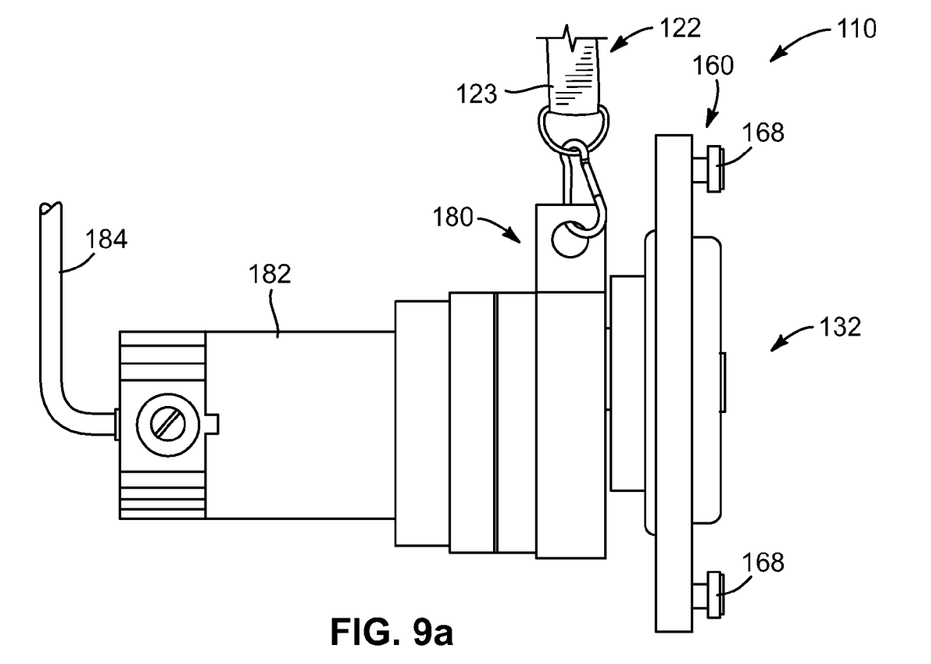
FIG. 9A is a perspective view of an alternative embodiment of a lifting mount with an integrated motor according to one embodiment of the backdrop system of the present invention.
Figure 9B:
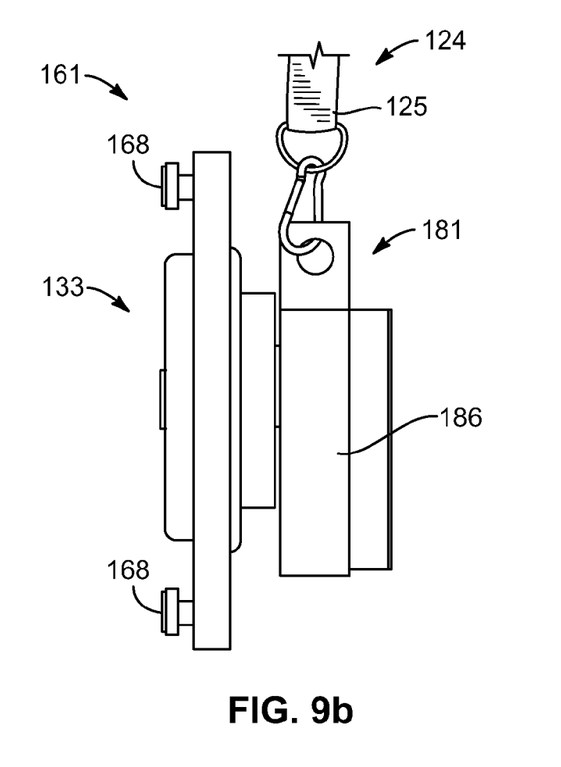
FIG. 9B is a perspective view of an alternative embodiment of a lifting mount without an integrated motor according to one embodiment of the backdrop system of the present invention.

Referring now to FIGS. 9A and 9B an alternative embodiment of the backdrop system 110 is shown. In this embodiment, much of the backdrop system 110 remains the same as the first described embodiment 10. However, the straps 122, 124 do not serve the dual purpose of height adjustment and rotation of the spool. Rather, the ends 123, 125 that are distant from the sheave 26 are detached from the attachment points 36, 37 and secured to attachment points 180, 181 adjacent the first and second flanges 160, 161 of the spool mounts 132, 133. Thus by engaging the motor 28 or manual hoist, the spool mounts 132, 133 are raised and the spool 12 is not rotated. This embodiment may be used as a standalone product or may easily be retrofitted to the backdrop system 10.

The rotation of the spool 12 is achieved by a motor 182 operably attached through a reduction gearing system to the first mount flange 160. The motor 182 may have a cord 184 that is plugged into a power source. In such instances it may be desirable to have a cord 184 that is spring coiled or wound on a retracting spool such that the cord 184 does not become tangled in the spool, straps, or other parts of the backdrop system 110. Alternatively, the motor 182 may be battery powered eliminating the cord 184. The motor 182 can be activated by a wireless or wired remote control or may be activated by directly turning on the motor 182.

The second flange 161 is attached to a freewheeling bearing assembly 186 allowing free circular rotation in either direction. The first and second flanges 132, 133 have T-shaped protrusions 168 or other attachment devices for securing the mount 130 to the spool 12, being locked in place by locking assemblies 70. When the motor 182 is activated an attached spool 12 may rotate in either direction. Stopping the motor 182 halts the rotation of the spool 12 in by force of gear ratio resistance. Alternatively, a locking or braking mechanism may be applied to halt the rotation of the spool 12.

The present invention also relates to a method of changing a spool 12 containing a backdrop 16. The spool 12 may be lowered from a first height to a second height. Generally, the first height is at a position substantially above the floor such as near the ceiling. The second height is generally a position where a user may reach the spool while maintain direct contact with the ground.

Once the spool 12 is lowered, a user may detach the spool 12 from lifting spool mounts 30. In the illustrated embodiment, the removal of the spool is accomplished by unlocking the lock 70. If the lock is a locking pin 76 the unlocking is done by sliding the locking pin 76 from a locked position to an unlocked position. Once the lock 70 is unlocked, the spool flanges 48 or lifting spool mount flanges 60, 160, 161 are rotated such that the T-shaped protrusions 68, 168 of the mount flanges 60, 160, 161 are positioned in the notches 58 of the spool flanges 48. The T-shaped protrusions may then be removed from the notches 58 and the spool 12 is detached from the mount 60.

A second spool 12 may then be obtained and attached to the mount 60 of the suspension system. The attachment is done by reversing the detachment steps, namely, putting the T-shaped protrusions 68, 168 in the notches 58 and rotating the flanges 48, 60, 160, or 161 until the T-shaped protrusions are at the end of the notches 58. The lock 70 is then activated securing the spool 12 in place. The spool 12 and backdrop 16 may then be raised back up to a position at or near the first position.

In certain embodiments the changing of the backdrop 16 may include winding the backdrop 16 on the spool 12 prior to lowering the spool 12. In other embodiments, the backdrop 16 may be wound on the spool 12 as it is lowered or after it is lowered. It will be appreciated that at certain times it may be advantageous not to have any spool 12 or backdrop 16 on the suspension system.

I claim:

1. A backdrop system comprising:
   a backdrop spool for receiving thereon a backdrop, the spool having a tube with a flange adjacent to a first end and a flange adjacent to a second end;
   a lifting device for adjusting the vertical position of the spool;
   a rolling device for rolling and unrolling the backdrop on the backdrop spool; and
   a lifting mount for attaching the spool to the lifting device, the backdrop spool being removable from the lifting mount at a lowered vertical position by unlocking a lock configured to secure flanges to the lifting mount.

2. The system of claim 1, further comprising a plurality of spools for receiving thereon a plurality of backdrops each spool configured to be mountable to and removable from the lifting spool mount.

3. The system of claim 1, wherein each of the plurality of backdrops is stored on a separate backdrop spool.

4. The system of claim 1, further comprising a plurality of backdrops configured to be separately received upon the backdrop spool.

5. The system of claim 1, wherein the horizontal position of the spool is adjustable.

6. The system of claim 1, wherein the flanges comprise attachment points for receiving mating members of the lifting spool mount.

7. The system of claim 1, wherein the lock comprises a locking pin.

8. The system of claim 1, wherein the lock comprises a lock segment attached to a spring steel strip.

9. The system of claim 1, wherein the lowered vertical position is a height that allows a user to remove or attach a spool to the mount while the user is in contact with a floor.

10. The system of claim 1, wherein the lifting device comprises a flexible strap or cable windably connected to a hoist.

11. The system of claim 10, wherein the hoist comprises a split sheave for receiving therein the flexible strap or cable.

12. The system of claim 1, wherein the lifting device and the rolling device are configured to provide simultaneous adjustment of the vertical position of the spool and rolling and unrolling of the backdrop.

13. The system of claim 1, wherein the lifting device and the rolling device are configured to provide consecutive adjustment of the vertical position of the spool and rolling and unrolling of the backdrop.

14. The system of claim 1, wherein the lifting device is configured to accommodate backdrop spools of varying lengths.

15. The system of claim 1, wherein the lifting device is controlled by direct controls.

16. The system of claim 1, wherein the lifting device is controlled by remote controls.

17. The device of claim 13, wherein the winding device is controlled by remote controls.

18. A method of changing a spool of a backdrop system, the spool having a tube with a flange adjacent to a first end and a flange adjacent to a second end;
   one or more mating members disposed within the flanges;
   a lifting device for adjusting the vertical position of the spool; a rolling device for rolling and unrolling the backdrop on the backdrop spool; and a lifting mount for attaching the spool to the lifting device; one or more mating members disposed within the lifting mount and configured to receive or be received by the mating members of the flanges, the backdrop spool being removable from or attachable to the lifting mount at a lowered vertical position, the method comprising:

lowering a first spool from a first height to a second height;

removing the first spool from a suspension system by disconnecting mating members of the flange from mating members of the lifting mount;

obtaining a second spool having a tube with a flange adjacent to a first end and a flange adjacent to a second end and having one or more mating disposed within the flanges;

attaching the second spool to the suspension system by connecting mating members of the flanges to mating members of the lifting mount; and raising the second spool to the first height.

19. The method of claim 18, further comprising the step of winding a first backdrop on the first spool.

20. The method of claim 19, wherein winding precedes lowering the spool from the first height to the second height.

21. The method of claim 19, wherein lowering the spool from the first height to the second height precedes winding.

22. The method of claim 18, wherein the winding of the backdrop occurs simultaneously with the raising or lowering of the spool.

23. The method of claim 18, wherein the winding of the backdrop is independent from the raising or lowering of the backdrop.

24. The method of claim 18, wherein the suspension system is raised or lowered without a spool attached.

25. A backdrop system comprising:

a backdrop spool for receiving thereon a backdrop, the spool having a tube with a flange adjacent to a first end and a flange adjacent to a second end;

one or more mating members disposed within the flanges;

a lifting device for adjusting the vertical position of the spool;

a rolling device for rolling and unrolling the backdrop on the backdrop spool; and a lifting mount for attaching the spool to the lifting device;

one or more mating members disposed within the lifting mount and configured to receive or be received by the mating members of the flanges, the backdrop spool being removable from or attachable to the lifting mount at a lowered vertical position.

* * * * *